United States Patent
Cabouillet et al.

(10) Patent No.: US 11,648,858 B2
(45) Date of Patent: May 16, 2023

(54) PANEL FOR A SEAT ELEMENT

(71) Applicant: Faurecia Sieges D'Automobile, Nanterre (FR)

(72) Inventors: Anne-Sophie Cabouillet, Boissy-le-Sec (FR); Fabrice Etienne, Bavilliers (FR)

(73) Assignee: Faurecia Sieges D'Automobile, Nanterre (FR)

( * ) Notice: Subject to any disclaimer, the term of this patent is extended or adjusted under 35 U.S.C. 154(b) by 552 days.

(21) Appl. No.: 16/746,672

(22) Filed: Jan. 17, 2020

(65) Prior Publication Data

US 2020/0238865 A1 Jul. 30, 2020

(30) Foreign Application Priority Data

Jan. 25, 2019 (FR) ..................... 19/00695

(51) Int. Cl.
*B60N 2/56* (2006.01)
*B60N 2/68* (2006.01)

(52) U.S. Cl.
CPC .......... *B60N 2/5678* (2013.01); *B60N 2/686* (2013.01)

(58) Field of Classification Search
CPC ........ B60N 2/56; B60N 2/5678; B60N 2/686; B60N 2/5657; B60N 2/565; A47C 7/74
See application file for complete search history.

(56) References Cited

U.S. PATENT DOCUMENTS

| | | | | |
|---|---|---|---|---|
| 5,800,749 A * | 9/1998 | Lewit | B29C 70/086 | 264/273 |
| 5,915,783 A * | 6/1999 | McDowell | A47C 7/748 | 219/217 |
| 6,733,072 B2 * | 5/2004 | Jaillet | B60N 2/70 | 297/180.12 |
| 7,267,386 B2 * | 9/2007 | Hesch | B60R 21/0428 | 296/211 |
| 7,977,608 B2 * | 7/2011 | Diemer | B60R 21/0152 | 219/217 |
| 8,287,998 B2 * | 10/2012 | Skelhorn | C04B 28/02 | 428/323 |
| 8,492,447 B2 * | 7/2013 | Jacob | C08J 9/0023 | 521/143 |
| 9,420,640 B2 * | 8/2016 | Li | H05B 3/03 | |
| 9,751,440 B2 * | 9/2017 | Dry | B60N 2/5657 | |
| 9,845,031 B2 * | 12/2017 | Oh | B60H 1/2227 | |
| 9,868,373 B2 * | 1/2018 | Oh | B60N 2/5635 | |
| 10,106,063 B2 * | 10/2018 | Kim | B60N 2/5678 | |
| 10,336,414 B1 * | 7/2019 | Paull | B63B 17/00 | |
| 10,875,428 B2 * | 12/2020 | Sayed | B60N 2/6009 | |
| 10,974,631 B2 * | 4/2021 | Min | D06N 3/0011 | |
| 11,167,674 B2 * | 11/2021 | Cabouillet | B32B 5/18 | |
| 11,173,816 B2 * | 11/2021 | Zhang | B60N 2/5657 | |

(Continued)

FOREIGN PATENT DOCUMENTS

| | | |
|---|---|---|
| CN | 101249811 A | 8/2008 |
| CN | 102574483 A | 7/2012 |

(Continued)

OTHER PUBLICATIONS

French Search Report issued in counterpart FR application No. 19/00695, dated Oct. 18, 2019, 3 pp.

(Continued)

*Primary Examiner* — Shin H Kim
(74) *Attorney, Agent, or Firm* — Kaplan Breyer Schwarz, LLP

(57) ABSTRACT

A back panel of a motor vehicle seat includes, on its visible external back side, a thermal layer.

14 Claims, 3 Drawing Sheets

(56) References Cited

U.S. PATENT DOCUMENTS

| | | | |
|---|---|---|---|
| 2012/0031452 A1* | 2/2012 | Sjolund | H01L 35/30 |
| | | | 136/229 |
| 2013/0140857 A1* | 6/2013 | Shin | B60N 2/5657 |
| | | | 297/180.13 |
| 2015/0224850 A1* | 8/2015 | Bank | F28D 20/023 |
| | | | 392/340 |
| 2016/0039321 A1* | 2/2016 | Dacosta-Mallet | B60N 2/5678 |
| | | | 219/202 |
| 2017/0072821 A1 | 3/2017 | Oh et al. | |
| 2018/0099594 A1 | 4/2018 | Min et al. | |
| 2018/0257456 A1* | 9/2018 | Oh | B60H 1/2215 |
| 2019/0335907 A1* | 11/2019 | Tanaka | A47C 7/748 |
| 2020/0238658 A1* | 7/2020 | Cabouillet | B32B 5/18 |
| 2020/0238865 A1* | 7/2020 | Cabouillet | C09D 5/26 |
| 2020/0238866 A1* | 7/2020 | Cabouillet | B32B 5/32 |

FOREIGN PATENT DOCUMENTS

| | | | |
|---|---|---|---|
| CN | 103057449 A | 4/2013 | |
| CN | 103328257 A | 9/2013 | |
| CN | 106515526 A | 3/2017 | |
| CN | 107161054 A | 9/2017 | |
| CN | 107244273 A | 10/2017 | |
| CN | 207311207 U | 5/2018 | |
| DE | 102013011058 A1 | 4/2014 | |
| EP | 1338476 A1 | 8/2003 | |
| EP | 1418091 A1 | 5/2004 | |
| EP | 3028894 A1 | 9/2018 | |
| FR | 2950577 A1 | 4/2011 | |
| JP | 4158808 A | 6/1992 | |
| JP | 2016-147608 A | 8/2016 | |
| JP | 2016-147610 A | 8/2016 | |

OTHER PUBLICATIONS

Office Action issued in Chinese patent application No. 202010074315. 6, dated Jun. 23, 2022, 10 pp.

Office Action issued in Chinese patent application No. 202010074315. 6, dated Nov. 29, 2021, 8 pp.

* cited by examiner

PANEL FOR A SEAT ELEMENT

This application claims the priority benefit of French patent application number 19/00695, the content of which is hereby incorporated by reference in its entirety to the maximum extent allowable by law.

FIELD

The present disclosure generally concerns motor vehicle seats and, more specifically, the back panels of seat elements.

BACKGROUND

Thermal heating and/or cooling elements are more and more often integrated to motor vehicle seats.

SUMMARY

An embodiment overcomes all or part of the disadvantages of known techniques of integration of thermal elements to the back panels of seat elements.

An embodiment provides a back panel of a motor vehicle seat comprising, on its visible outer back side, a thermal layer.

According to an embodiment, the back panel comprises, on the inner surface of the thermal layer, a layer of non-expanded foam.

According to an embodiment, the back panel comprises, on the inner surface of the layer of non-expanded foam, a layer of expanded foam.

According to an embodiment, said thermal layer is heating.

According to an embodiment, said thermal layer is cooling.

According to an embodiment, said thermal layer comprises a layer of thermal paint.

According to an embodiment, said thermal layer comprises a thermal film.

According to an embodiment, said thermal layer comprises on its outer surface a varnish layer.

According to an embodiment, said panel is a panel for regulating the temperature of spaces located in second and in third rows, respectively equipping seats of first and second rows.

An embodiment provides a method of forming a back panel of a motor vehicle seat comprising a step of forming a thermal outer layer.

According to an embodiment, said step comprises at least a first sub-step of deposition of a paint layer.

According to an embodiment, the paint is thermal paint.

According to an embodiment, said step comprises a second sub-step of deposition of a layer of thermal paint on the inner surface of the paint layer of the first sub-step.

According to an embodiment, said step comprises a second sub-step of deposition of a thermal film on the paint layer.

According to an embodiment, the method further comprises a step of deposition of an outer varnish layer.

According to an embodiment, the method further comprises the successive steps of:
  depositing on the inner surface of the thermal layer a layer of non-expanded foam;
  depositing on the inner surface of the layer of non-expanded foam a layer of expanded foam.

The foregoing and other features and advantages will be discussed in detail in the following non-limiting description of specific embodiments in connection with the accompanying drawings.

DETAILED DESCRIPTION

Figure 1:
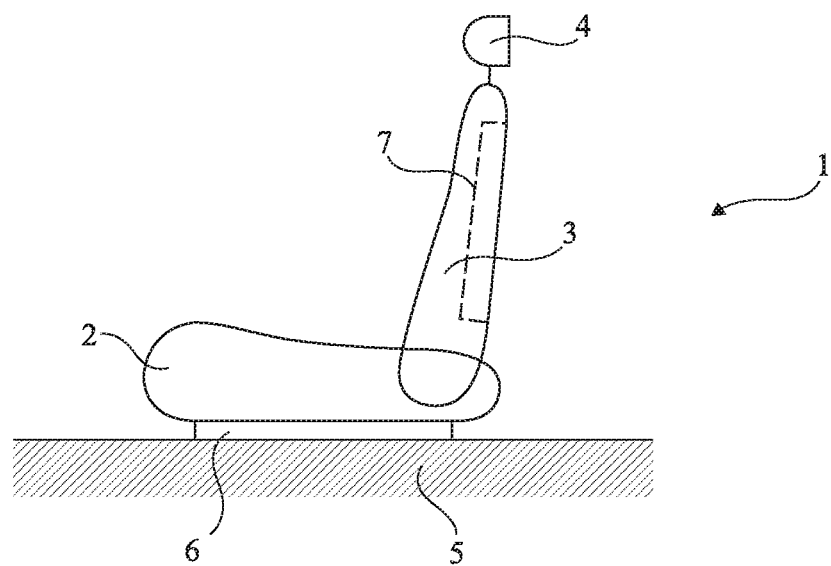
FIG. 1 is a simplified lateral view of a motor vehicle seat.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the usual seat elements which are not necessary to the understanding, such as the frame, have not been detailed.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a seat in a normal position of use.

The terms "about", "approximately", "substantially", and "in the order of" are used herein to designate a tolerance of plus or minus 10%, preferably of plus or minus 5%, of the value in question.

FIG. 1 is a simplified lateral view of a motor vehicle seat.

Such a seat comprises a seat bottom piece 2 having a backrest 3 jointed thereto, most often topped with a headrest 4. The assembly may be reinforced by a frame, generally made of metal. The seat bottom piece may be connected to floor 5 of the vehicle by a slide rail mechanism 6. Seat 1 may also comprise one or a plurality of armrests (not shown).

Seat bottom piece 2, backrest 3, and headrest 4 each comprise, on a first surface, or front side, in contact with the user, upholstery.

Backrest 3 comprises on its second surface, or back side, a back panel 7. Panel 7 is a piece different from the upholstery, fastened to the back of backrest 3 of seat 1. The fastening is for example obtained by clips or by slide fasteners, on the frame or on the upholstery.

Reference will be made hereafter to the back panel of the backrest. However, unless otherwise specified, all that will be described hereafter more generally applies to any seat element for which the same problems are posed, for example, a back panel of a headrest.

Figure 2:
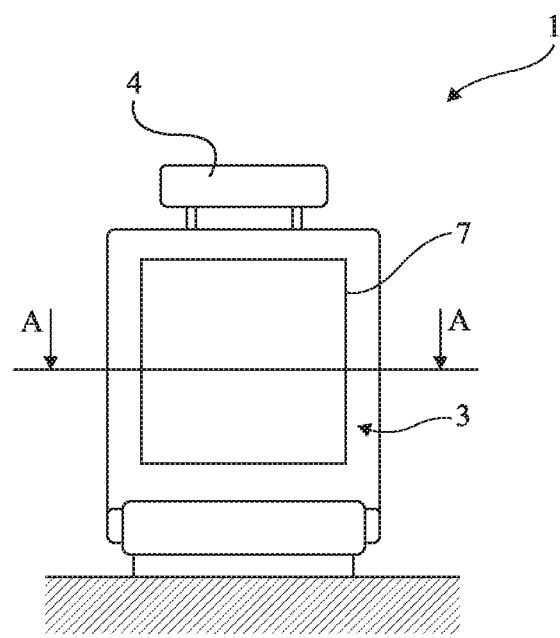
FIG. 2 is a simplified back view of an embodiment of motor vehicle seat element.

FIG. 2 is a simplified back view of an embodiment of a motor vehicle seat element.

Panel 7 is here shown with a rectangular shape, but any other shape, for example, circular, triangular, etc. is appropriate.

Figure 3:
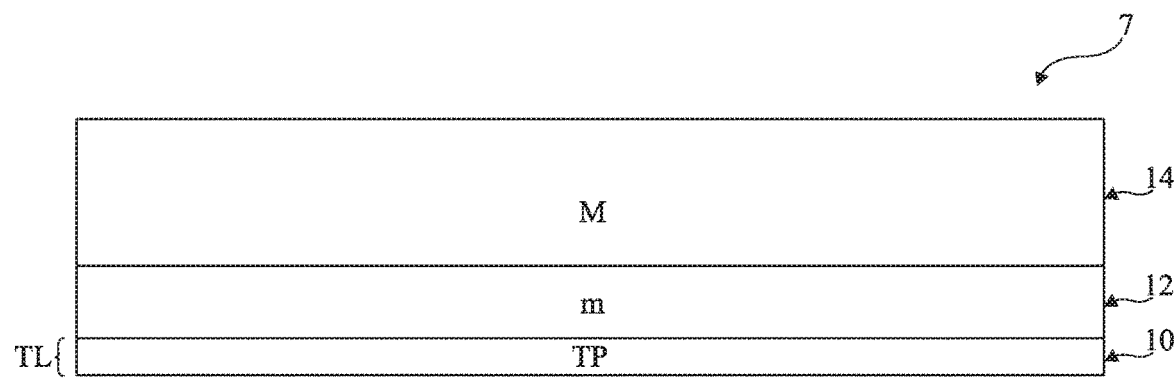
FIG. 3 shows a cross-section view of an embodiment of a back panel of a seat element.

FIG. 3 shows a cross-section view of an embodiment of a back panel of a seat element.

FIG. 3 is a cross-section view of back panel 7 taken along line A-A of FIG. 2, which is a horizontal cross-section line crossing backrest 3 through back panel 7.

The panel is formed of the stacking of a thermal layer TL, of a layer 12 of non-expanded foam m, and of a layer 14 of expanded foam M. For example, the layers have the same surface areas.

The formulations of the non-expanded and expanded foams, m and M, are selected so that after the polymerization, expanded foam M has a lower density than non-expanded foam m. The chemical products thus used in the composition of expanded foam M are selected to obtain a polymerization reaction generating open cells, that is, cavities filled with air. Thereby, foam m comprises less voids or air cells than foam M.

In practice, during a deposition by sputtering, air bubbles are trapped in the foam. If air is thus intrinsically present in foam m after the polymerization, it is in a parasitic or negligible quantity as compared with the quantity of air present in foam M.

In the embodiment of FIG. 3, thermal layer TL is a layer 10 of thermal paint TP. Thermal paint layer 10 forms the visible outer surface, or visual appearance layer, of the panel.

Electrodes (not shown) are for example placed at opposite ends of the layer of thermal paint TP.

As an example, the thermal paint is a heating paint, such as carbon electric paint known under trade name CeP.

Figure 4:
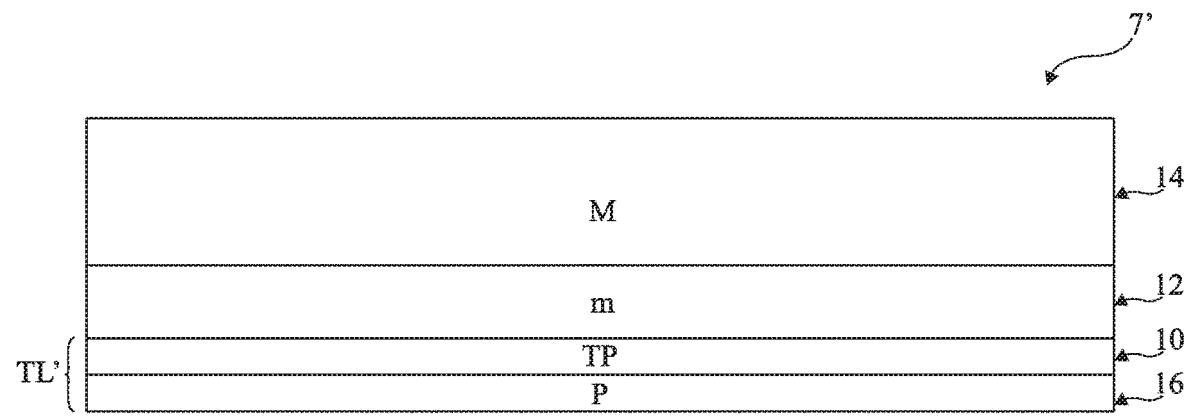
FIG. 4 shows a cross-section view of another embodiment of a back panel of a seat element.

FIG. 4 shows a cross-section view of another embodiment of a back panel 7' of a seat element.

Panel 7' is different from the panel 7 of FIG. 3 in that thermal layer TL' is here formed of the stacking of a layer 10 of thermal paint TP and of a layer 16 of non-thermal paint P. Paint layer 16 covers thermal paint layer 10 and forms the visible outer back side of panel 7'.

This enables to obtain different finishes of panel 7' without imposing constraints in terms of appearance, such as the color of the paint, due to the thermal paint TP used. Typically, thermal paints are black-colored.

As an example, layer 10 of thermal paint TP may have a surface area smaller than that of the other layers 12, 14, and 16 and/or only be present in certain areas of the panel.

As in the embodiment of FIG. 3, electrodes (not shown), are for example placed at opposite ends of the layer of thermal paint TP.

Figure 5:
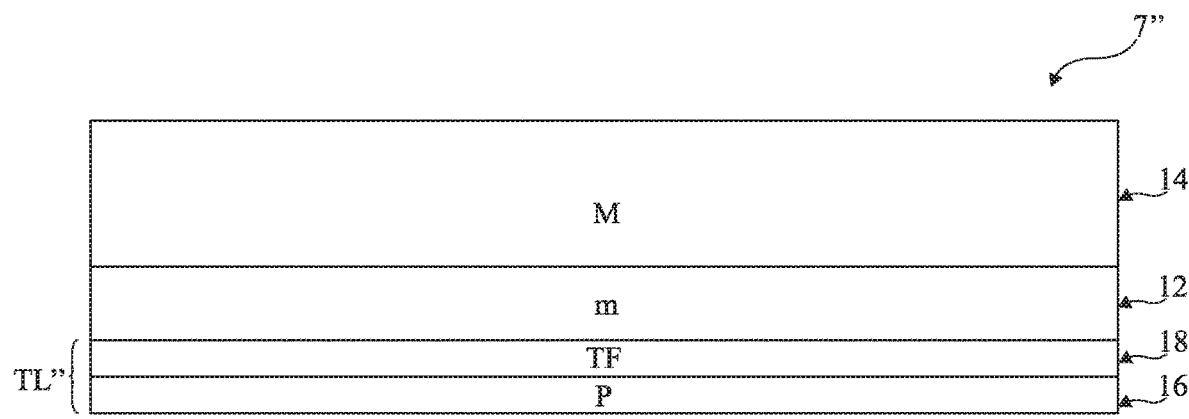
FIG. 5 shows a cross-section view of another embodiment of a back panel of a seat element.

FIG. 5 shows a cross-section view of another embodiment of a seat element back panel 7".

Panel 7" differs from the panel 7' of FIG. 4 in that layer 10 of thermal paint TP is replaced with a thermal film TF forming layer 18. Layer 16 of paint P covers layer 18 of thermal film TF and forms the visible outer surface of panel 7".

Preferably, layer 18 of thermal film TF has an outer surface appearance such that it is little or not perceptible from the outside. For example, its outer surface is smooth so that the appearance of the surface of panel 7" is homogeneous.

Any type of heating and/or cooling thermal film may be used, for example, a carbon film.

As an example, layer 18 of thermal film TF may have a surface area smaller than that of the other layers 12, 14, and 16 and/or only be present in certain areas of the panel.

As in the embodiments of FIG. 3 and of FIG. 4, electrodes (not shown) are for example placed at opposite ends of the layer of thermal paint TP.

Panels 7, 7', and 7" may be covered on their outer surface with a varnish layer.

Figure 6:
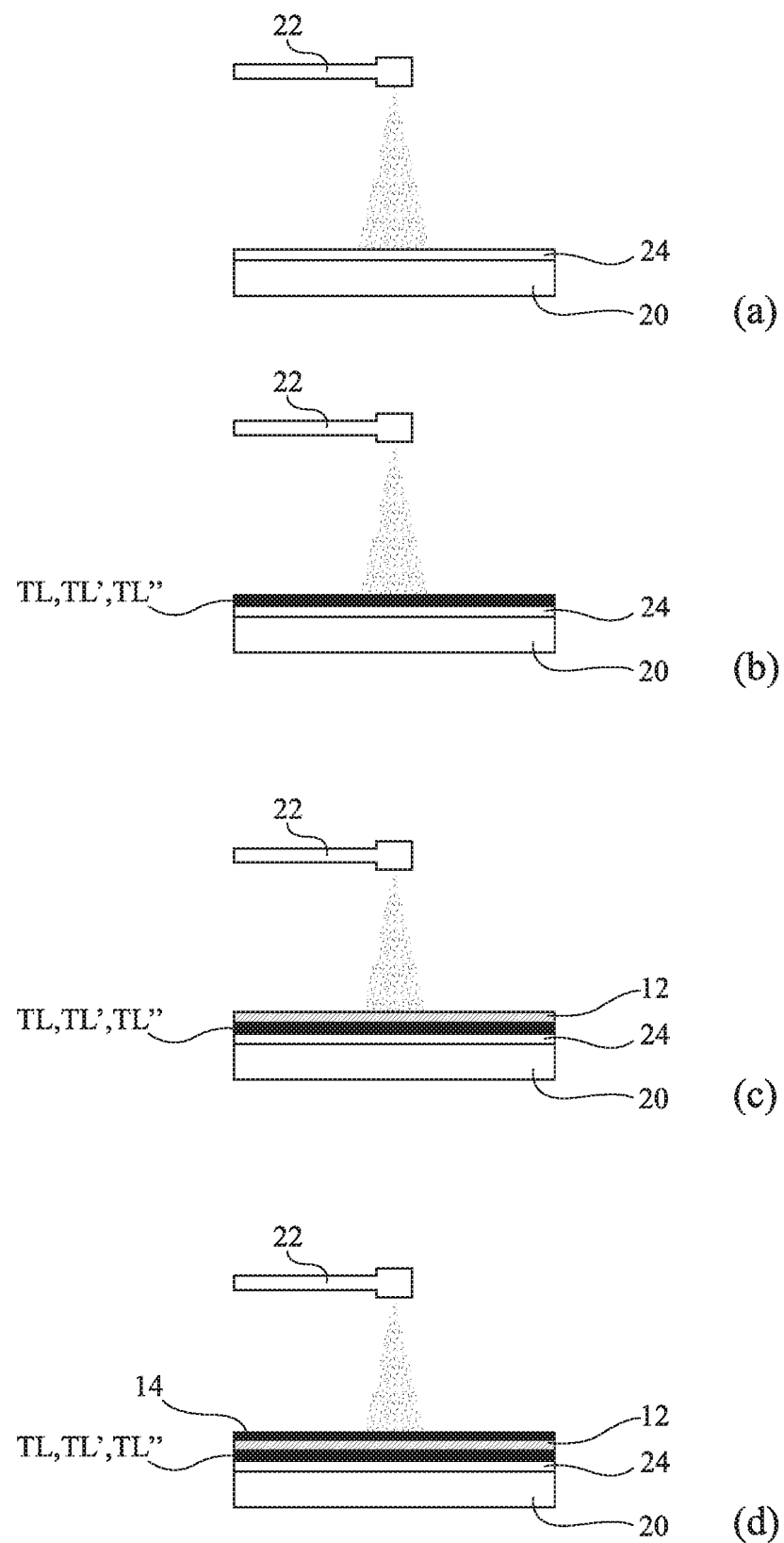
FIG. 6 shows, in views (a) to (d), cross-section views illustrating steps of embodiments of a method of forming a back panel of a seat.

FIG. 6 shows, in views (a) to (d), cross-sections illustrating steps of different embodiments of a method of forming a back panel of a seat.

A mold 20, or vessel, having the shape of the back side, or outer surface, of the panel 7 to be formed, is used. This surface preferably forms the visible surface of the back panel. Unless otherwise specified, the deposition of the different layers is performed by spraying by means of a nozzle 22.

In a first step, shown in FIG. 6(a), a layer 24 of a release agent is deposited in mold 20.

If desired, a varnish layer (not shown) may then be deposited on layer 24 of release agent.

In a second step, shown in FIG. 6(b), a thermal layer TL is deposited. The latter is deposited on layer 24 of release agent or the varnish layer according to the embodiment.

According to the embodiment, this step (b) may be divided into a plurality of sub-steps.

The step of deposition of thermal layer TL of the embodiment shown in FIG. 3 is performed in a single step of deposition of a thermal paint layer.

The step of deposition of the thermal layer TL' of the embodiment shown in FIG. 4 is carried out in two sub-steps. A first sub-step of deposition of a non-thermal paint layer is followed by a second sub-step of deposition of a thermal paint layer.

The step of deposition of the thermal layer TL" of the embodiment shown in FIG. 5 is carried out in two sub-steps. A first sub-step of deposition of a non-thermal paint layer is followed by a second sub-step of deposition of a thermal film. The deposition of the thermal film is for example performed by application of the film in one piece on paint layer 16.

As an example, any other element necessary to the proper operation of the thermal layer, such as electrodes, may then be positioned on the thermal layer.

In a third step, shown in FIG. 6(c), a layer 12 of non-expanded foam is deposited on thermal layer TL.

In a fourth step, shown in FIG. 6(d), a layer 14 of expanded foam is deposited on layer 12 of non-expanded foam.

In a fifth step, not shown, the mold is closed by means of a cover, or die, having the shape of the back side, or hidden surface, of the panel 7 to be formed. The cover thus enables to shape the thickness of layer 14 of expanded foam and to give the desired outer shape to the hidden surface of panel 7.

Various embodiments and variations have been described. It will be understood by those skilled in the art that certain features of these various embodiments and variations may be combined, and other variations will occur to those skilled in the art. In particular, the selection of the compositions of the used foams according to the desired features is within the abilities of those skilled in the art.

Finally, the practical implementation of the described embodiments and variations is within the abilities of those skilled in the art based on the functional indications given hereabove. In particular, the selection of the paint or of the thermal film as well as the selection of their area(s) of application to obtain a desired thermal performance depends on the application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A back panel of a motor vehicle seat comprising:
   on a visible outer back side, a thermal layer comprising:
      a thermal paint layer or a thermal film; and
      a non-thermal paint layer covering the thermal paint layer or the thermal film;
   on an inner surface of the thermal layer, a layer of non-expanded foam; and
   on an inner surface of the layer of non-expanded foam, a layer of expanded foam;
   wherein the layer of non-expanded foam comprises less voids or air cells than the layer of expanded foam.

2. The back panel of claim 1, wherein said thermal layer is heating.

3. The back panel of claim 1, wherein said thermal layer is cooling.

4. The back panel of claim 1, wherein said thermal layer comprises on an outer surface a varnish layer.

5. The back panel of claim 1, wherein said panel is a panel for regulating the temperature of spaces located in second and third rows, respectively equipping seats of first and second rows.

6. The back panel of claim 1, wherein the thermal paint layer comprises carbon electric paint.

7. The back panel of claim 1, wherein the thermal film comprises a carbon film.

8. A method of forming a back panel of a motor vehicle seat element comprising steps of:
   forming a thermal outer layer comprising:
      a thermal paint layer or a thermal film; and
      a non-thermal paint layer covering the thermal paint layer or the thermal film;
   depositing on an inner surface of the thermal layer a layer of non-expanded foam; and
   depositing on an inner surface of the layer of non-expanded foam a layer of expanded foam.

9. The method of claim 8, wherein said step of forming the thermal outer layer comprises at least a first sub-step of depositing the non-thermal paint layer.

10. The method of claim 9, wherein said step of forming the thermal outer layer further comprises a second sub-step of depositing the thermal paint layer on an inner surface of the non-thermal paint layer.

11. The method of claim 9, wherein said step of forming the thermal outer layer further comprises a second sub-step of depositing the thermal film on the non-thermal paint layer.

12. The method of claim 8, further comprising a step of depositing an outer varnish layer.

13. The method of claim 8, wherein the thermal paint layer comprises carbon electric paint.

14. The method of claim 8, wherein the thermal film comprises a carbon film.

* * * * *